United States Patent Office 3,436,223
Patented Apr. 1, 1969

3,436,223
CURVULARIN-CONTAINING ANIMAL FEED FOR PROMOTING GROWTH AND INCREASING FEED EFFICIENCY
Herbert L. Wehrmeister, Terre Haute, Ind., assignor to Commercial Solvents Corporation, New York, N.Y., a corporation of Maryland
No Drawing. Filed June 29, 1966, Ser. No. 561,353
Int. Cl. A23k 1/22
U.S. Cl. 99—2                3 Claims

ABSTRACT OF THE DISCLOSURE

Curvularin is added to animal feed in amounts effective to promote growth and increase the feed efficiency of meat-producing animals.

---

This invention relates to compositions and methods for the increase of growth rate in meat-producing animals.

It has been discovered that in meat-producing animals an increased rate of growth and an increased efficiency of food conversion can be achieved according to the process of the present invention by administering curvularin to such animals either in combination with a conventional feed or by administration in a suspending agent, solid carrier, or other vehicle.

Curvularin and its production are described in an article entitled "Studies in Relation to Biosynthesis. Part XX. The structure and Biosynthesis of Curvularin" by A. J. Birch, O. C. Musgrave, R. W. Rickards, and Herchel Smith, appearing in the "Journal of Chemical Society" (1959) at page 3146; and an article entitled, "Curvularin Formation by Penicillium Steckii" by D. Fennell, K. B. Raper and F. H. Stodola appearing in "Chemistry and Industry" (1959) at page 3146.

An animal feed for oral administration of curvularin according to this invention can be readily prepared by intimately admixing curvularin alone or as a premix with a conventional animal feed composition to provide a homogeneous feed product. When animals are fed with this feed product containing curvularin, growth, as measured in terms of average daily weight gain, and food conversion efficiency, as measured by the amount of feed consumed per pound weight gain, is increased.

The amount of curvularin administered depends upon the species of animal, its age, weight, and average amount of feed consumed daily. Ordinarily the dosage administered falls in the range of 0.1 to 20 milligrams, preferably .01 to .05 milligrams per kilogram body weight of the animal per day.

The following table illustrates the daily dosage for representative animals.

Table 1

| Animal: | Daily dosage, mg. |
|---|---|
| Beef cattle | 5–15 |
| Lambs | 1–5 |
| Swine | 1–5 |
| Poultry | 0.2–3 |

In addition to incorporation in feed this invention contemplates the oral administration of curvularin in other vehicles well known to the art, for instance, in solution in water, alcohol, oils, syrups, and suspending agents, e.g. gum arabic or similar polysaccharides. Alternatively, the dosage may be given with solid carriers which can be any palatable foodstuffs such as sugar, sweetened starch compositions, and the like. The compositions can be in pill, paste, capsule, or tablet form, which can be covered with a sweetened or flavored edible coating, if desired.

Other suitable methods of administration include parenteral administration and subsutaneous implant.

The following examples illustrate the best mode contemplated for carrying out the invention but are not to be construed as limiting the scope thereof.

Example I

A swine diet for growing hogs of 40 to 400 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bone meal | 0.5 |
| Salt | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin $B_{12}$ supplement [4] | 0.08 |

[1] Contains the following percent of minerals: Mn, 12; Co, 0.08; Fe, 5.0; Cu, 0.4; I, 0.24; Zn, 0.7.
[2] Contains 300 USP units $D_3$/gm. and 1500 I.U. A/gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per pound.

To 999 parts of the preceding feed is added 1 part of a premix composition prepared by mixing 1.5 gm. of curvularin with sufficient ground limestone to make one pound. The feeding composition so prepared supplies 1.5 mg. of curvularin per pound or about 3.5 parts per million.

Swine have to receive two pounds of the foregoing feed per head per day together with enough regular feed to constitute an ordinary daily ration and when so fed have an increased ratio of weight gain and improved utilization of feed. A fattening feed for 800 pound yearling cattle is prepared from the following types and amounts of ingredients:

Example II

| | Percent |
|---|---|
| Ground ear corn | 89.75 |
| Soybean oil meal, 44% | 9.0 |
| Ground limestone | 0.7 |
| Salt | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 999 parts of the preceding feed is added 1 part of a premix composition prepared by mixing 2 gm. of curvularin with sufficient wheat flour to make 1 pound. The feeding composition so prepared supplied 2 mg. of curvularin per pound, or about 4.4 parts per million.

Cattle are to receive 5 lbs. of the foregoing feed per head per day together with hay and when so fed have an increased rate of weight gain and improved utilization of feed.

A chicken feed for broilers is prepared from the following types and amounts of ingredients:

Example III

| | Percent |
|---|---|
| Yellow corn meal | 67.35 |
| Soybean oil meal | 24.00 |
| Menhaden fish meal | 6.00 |
| Steamed bone meal | 1.00 |
| Ground limestone | 1.00 |
| Iodized salt | .34 |
| 25% choline chloride | .13 |
| Vitamin $B_{12}$ supplement (6 mg./lb.) | .10 |
| Manganese sulfate | .02 |
| Supplemental vitamin mix [1] | .06 |

[1] Consisting of 16.0 gm. vitamin A supplement (10 units/mg.); 3.6 gm. vitamin $D_3$ supplement (15,000 units/gm.); 7.1 gm. riboflavin supplement (1 gm. riboflavin per ounce); 500 mg. niacin.

To 999 parts of the preceding feed is added 1 part of a premix composition prepared by mixing 2 gm. curvularin which sufficient soybean mill feed to make 1 pound.

The feeding composition is usefully fed to chickens for increased rate of weight gain and improved utilization of feed in an amount of about 100 pounds of feed per 1,000 chickens. Similarly the composition can be fed to turkeys, ducks and geese.

A diet for fattening lambs is prepared from the following types and amounts of ingredients:

Example IV

| | Percent |
|---|---|
| Ground ear corn | 82.05 |
| Alfalfa meal | 10.0 |
| Soybean oil meal, 44% | 7.0 |
| Ground limestone | 0.3 |
| Salt | 0.6 |
| Trace mineral mixture [1] | 0.05 |

[1] Contains the following percent of minerals: Mn, 12; Co, 0.08; Fe, 5.0; Cu, 0.4; I, 0.24; Zn, 0.7.

Fattening lambs have to receive two pounds of the foregoing feed per head per day together with enough regular feed to constitute an ordinary daily ration and when so fed have an increased rate of weight gain and improved utilization of feed.

Suitable animal feed compositions with which curvularin can be admixed include those described in McGraw-Hill Encyclopedia of Science and Technology, McGraw-Hill Book Company, Inc., New York, volume 1, pages 425–427 (1960).

In the following example, a subcutaneous implant was employed.

Example V

Crossbred Texas wether lambs were adjusted to environment, drenched, individually identified and brought onto full feed of complete pelleted rations. After a 7 day pretest period all lambs were sorted into outcome groups by weight and gain during the pretest period. Ingredients of the ration were as follows:

| Basal finishing ration, | pounds |
|---|---|
| Finely ground cobs | 650 |
| Ground corn | 600 |
| Dehydrated alfalfa meal | 300 |
| Dried molasses product (85%) | 120 |
| Soybean meal, 44% | 300 |
| Dicalcium phosphate | 14 |
| Trace mineral salt | 20 |
| Premix [1] | 14 |
| | 2,018 |

[1] Premix:
| | | |
|---|---|---|
| Ground corn | lb | 10 |
| Limestone | lb | 4 |
| Vitamin A (30,000 IU) | gm | 100 |
| Vitamin $D_2$ (64,000 IU) | gm | 10 |

A uniform group of 15 lambs was assigned to each of three treatments or control treatment, treatment with curvularin and treatment with diethylstilbestrol. Treatment was administered individually by depositing a single 12 mg. implant in the distal portion of the eminentia conchae of the tagged but surgically unmarked ear.

Individual weight and feed conversion data were recorded after 21 days and upon termination of the 35 day test. The test was terminated after this duration because lambs had reached market weight. The test results are shown in Table I below:

TABLE I

| Treatment | Relative Estrogenicity | Av. Daily Gain, lb. | | | Feed Conversion, lb./cwt. gain* | | |
|---|---|---|---|---|---|---|---|
| | | 0–3 wk. | 3–5 wk. | 0–5 wk. | 0–3 wk. | 3–5 wk. | 0–5 wk. |
| Control | | 0.49 | 0.29 | 0.41 | 692 | 1,087 | 805 |
| 12 mg. Curvularin | 0 | 0.66 | 0.49 | 0.59 | 585 | 809 | 657 |
| 12 mg. DES | 1,200–2,000 | 0.83 | 0.60 | 0.73 | 432 | 629 | 496 |

*Feed data adjusted for mortality.

It is claimed:

1. An animal feed composition comprising curvularin in combination with an animal feed wherein the curvularin is present in amounts effective to promote growth and to increase the efficiency of food conversion in meat-producing animals.

2. A method for obtaining increased weight gain in meat-producing animals which comprises the administration of curvularin in an amount effective to promote growth and increase the efficiency of food conversion.

3. A method for obtaining increased weight gain in meat-producing animals which comprises the administration of curvularin in an amount effective to promote growth and increase the efficiency of food conversion in combination with an animal feed.

References Cited

Fennell et al.: "Curvularin Formation by Pencillium Steckii," Chemistry and Industry, p. 3182, 1959.

LIONEL M. SHAPIRO, *Primary Examiner.*

NORMAN ROSKIN, *Assistant Examiner.*